United States Patent [19]

Kolavcic

[11] 3,903,739
[45] Sept. 9, 1975

[54] COMPENSATING DEVICE IN MAGNETOELASTIC TRANSDUCERS
[75] Inventor: Pavel Kolavcic, Vasteras, Sweden
[73] Assignee: Allmanna Svenska Elektriska Aktiebolaget, Vasteras, Sweden
[22] Filed: Sept. 3, 1974
[21] Appl. No.: 502,726

[30] Foreign Application Priority Data
Sept. 13, 1973 Sweden.............................. 73124505

[52] U.S. Cl............... 73/141 A; 73/DIG. 2; 336/20; 310/26
[51] Int. Cl. ............................................... G01l 1/12
[58] Field of Search........ 73/141 A, DIG. 2, 88.5 R; 324/34 MA; 310/26; 336/20

[56] References Cited
UNITED STATES PATENTS
1,586,877  6/1926  Buckley ........................... 73/DIG. 2
3,664,187  5/1972  Guransson ....................... 73/DIG. 2

Primary Examiner—James J. Gill
Assistant Examiner—Anthony V. Ciarlante

[57] ABSTRACT

In order to compensate for hysteresis in the measuring signal from a magnetoelastic transducer constituted by an iron core and windings arranged in the core for generating a magnetic field in the core and measuring the changes in the magnetic field is occurred when the core is affected by a mechanical force, compensating windings are located in apertures in the core at points where the field strength is considerably lower than around the apertures for the measuring windings and where the mechanical stress condition of the mechanical force acting on the core is different. The signals generated by the measuring windings and the compensating windings are added in such phase position of the signals that the hysteresis component of the compensating signal is in opposition to the hysteresis component of the signal produced by the measuring windings.

4 Claims, 29 Drawing Figures

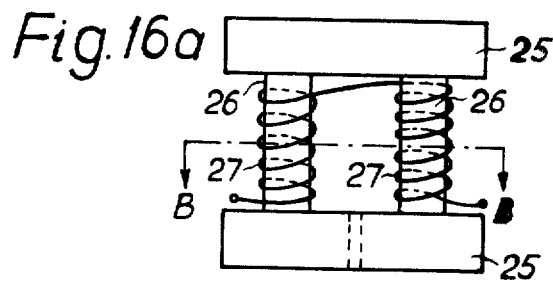
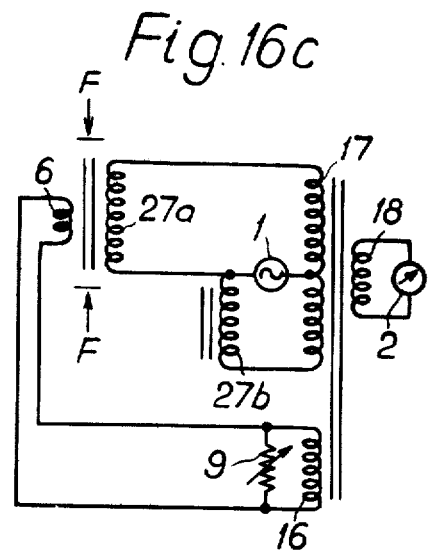
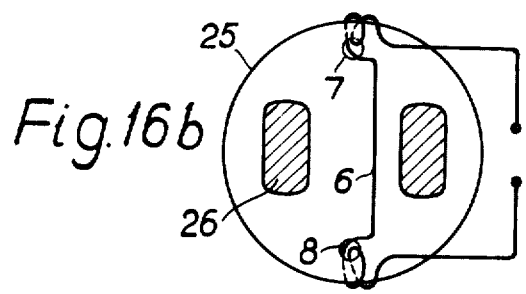
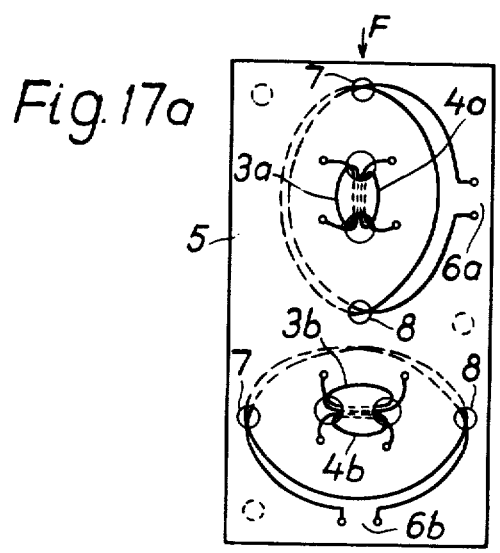
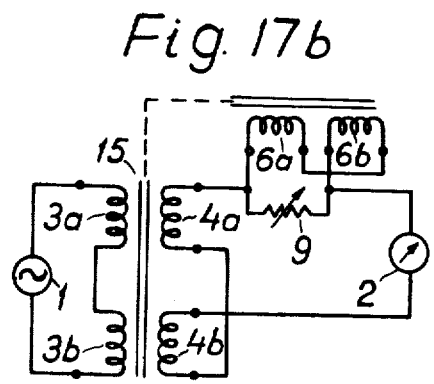
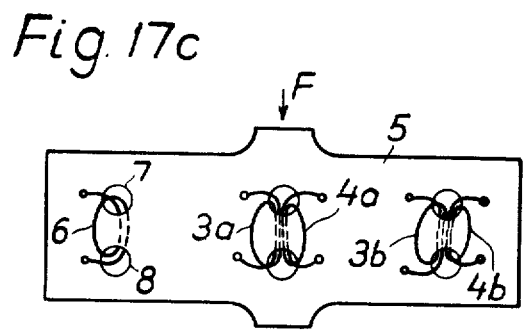
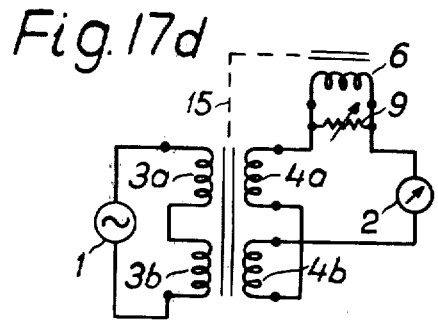

3,903,739

COMPENSATING DEVICE IN MAGNETOELASTIC TRANSDUCERS

BACKGROUND OF THE INVENTION

1. Field of the Invention

The present invention relates to a means for compensation of measuring faults occurring as a result of hysteresis in magnetoelastic transducers which consist of a core of magnetic material provided with windings for generating a magnetic flux in the core and for sensing the changes in the magnetic flux which arise when the core is affected by a mechanical force.

2. The Prior Art

The connection between measuring magnitude and output signal of a transducer of the present type is usually described as the characteristic of the transducer. The ideal characteristic which is aimed at is normally a straight line, the inclination of which is described as the sensitivity of the transducer. The characteristic obtained in practical cases normally shows major or minor deviations from the ideal in the form of, for example, non-linearity and hysteresis. By "hysteresis" is meant the maximum difference in the output signal of a certain measuring value which is obtained when the measuring magnitude is changed from zero to maximum value and back to zero.

All magnetoelastic transducers show major or minor hysteresis faults. The hysteresis can be divided into external and internal hysteresis. The external hysteresis is normally due to imperfections in the surfaces of the transducer on which the force is applied and to a considerable degree it can be eliminated, among other things, by carefully working these surfaces. The internal hysteresis is due to inherent properties of the core material. It can be improved to some extent by selecting a suitable material, but to eliminate completely the inner hysteresis in this way has proved so far to be impossible.

SUMMARY OF THE INVENTION

According to the present invention, however, the internal hysteresis can be practically eliminated by providing the core with an additional winding, referred to herein as the compensating winding. This winding is so adapted that a signal with great internal hysteresis but low sensitivity is generated therein. Now, if this signal is added to the measuring signal so that the hysteresis components of the measuring signal and the compensating signal are in opposition to each other, and if the number of turns of the compensating winding is chosen so that its hysteresis component has approximately the same amplitude as the corresponding component of the measuring signal, the resulting signal will have a considerably reduced hysteresis.

In order that the signal from the compensating winding will have the above-mentioned characteristic with low sensitivity and great hysteresis, the windings is located in channels positioned in those areas of the transducer core where the strength of the magnetic field generated by the main windings is low in relation to the field strength in the channels for the measuring winding.

BRIEF DESCRIPTION OF THE DRAWINGS

In the accompanying drawings:

FIG. 16a shows a side view and FIG. 16b in section substantially on the line B—B of FIG. 16a a transducer formed by pressure plates connected by legs;

FIG. 16c shows the connections of such a transducer;

FIG. 17a shows the application of the invention to a transducer having pairs of measuring windings, only one of which is affected by the force;

FIG. 17b shows electrical connections for FIG. 17a;

FIG. 17c shows the application of the invention to a transducer in which the winding pairs are placed in parallel but one is placed so that it is substantially uneffected by the force;

FIG. 17b shows the electrical circuit for the device of FIG. 17c;

FIG. 18b shows the electrical circuit for the device of FIG. 18a; and

DESCRIPTION OF THE PREFERRED EMBODIMENTS

Figure 2:
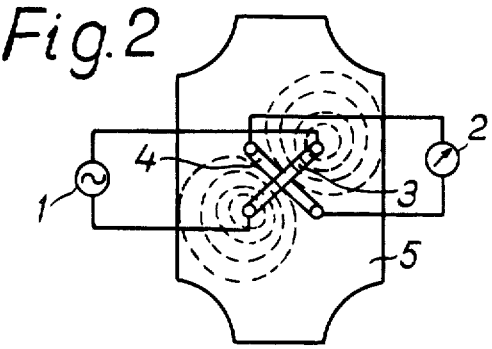
FIG. 2 shows the appearance of the magnetic field in an unloaded transducer.

FIG. 2 shows the principle of the winding arrangement in a well-known type of magnetoelastic transducer. An AC voltage source 1 delivers magnetizing current to a magnetizing winding 3 which is arranged in a core 5 of laminated magnetic material. A measuring winding 4 is arranged in the core and connected to a measuring arrangement shown as a measuring device 2. Such a transducer is known, for example, from U.S. Pat. No. 2,895,332. The two windings are arranged so that, when the transducer is unloaded, in principle no current occurs in the measuring winding, since the winding 4 is symmetrically positioned in relation to the winding 3, and the magnetic flux indicated by the broken lines appearing in the core 5 of the transducer is symmetrical and therefore does not intersect the measuring winding.

Figure 3:
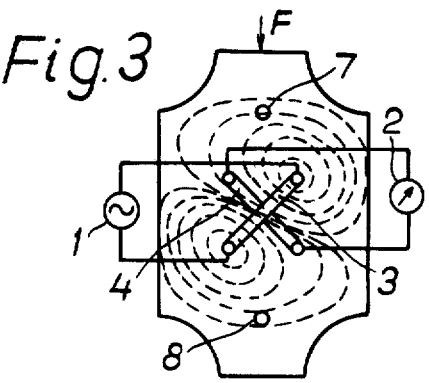
FIG. 3 shows the appearance of the magnetic field in a loaded transducer.

FIG. 3 shows how the magnetic flux changes its appearance when the transducer is loaded with a mechanical force F, because the permeability in the pressure direction is reduced. The change of the magnetic flux causes a voltage to be induced in the measuring winding 4 and to be indicated by the measuring device 2. However, this voltage signal is as a rule impaired by a certain amount of hysteresis, which is due to the inherent properties of the core material. The hysteresis may be of the order of magnitude of fractions of one part per million and up to a few parts per million. When making use of the transducer for precision measuring it is desirable to reduce it to a quite negligible value.

Figure 1:
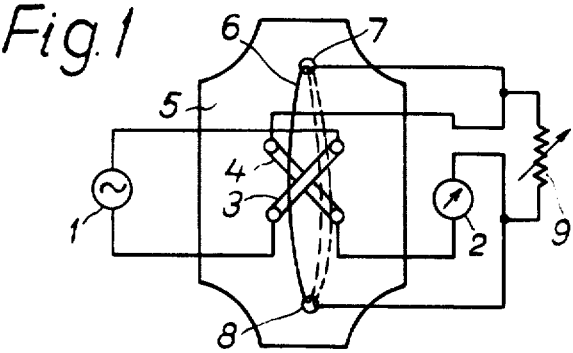
FIG. 1 shows the principle of arranging the magnetizing winding, the measuring winding and the compensating winding in a specified type of magnetoelastic transducer.

According to the invention, this reduction is accomplished with the help of an additional winding 6, which, as is shown in FIG. 1, is wound through two apertures 7 and 8 in the core. These apertures have been indicated in FIG. 3 as well and from this figure it is clear that the holes are located in areas where the field strength is low and that only a minor part of the magnetic flux will traverse the winding which is arranged in the apertures. The electromotive force induced in said winding 6 is therefore comparatively small. When the mechanical force F is changed, the magnitude of the flux traversing the compensating winding is affected by alterations in the permeability around the apertures 7 and 8. It has been demonstrated that the change of permeability in areas with low magnetic field strength is impaired by great hysteresis, and the signal from the compensating winding therefore shows very high hysteresis in relation to the magnitude of the signal. If the compensating signal is added to the actual measuring signal from the winding 4 with a suitable sign, in such a phase that the hysteresis component of the compensating signal is in opposition to the hysteresis component of the signal produced in the measuring winding, the hysteresis components will counterbalance each other, while at the same time the total signal amplitude is affected to an insignificant extent only.

This signal addition can achieved, for example, as indicated in FIG. 1, by series-connecting the measuring winding and the compensating winding. The number of turns of the compensating winding is adjusted so that the hysteresis of the compensating signal is somewhat greater than the hysteresis of the measuring signal. Parallel to the compensating winding there is applied an adjustable resistor 9, by means of which the magnitude of the compensating signal is reduced until optimum compensation of the hysteresis is obtained.

The location of the apertures 7 and 8 shown in FIG. 1 is not the only one giving a desirable result. The fundamental idea of the invention is that the apertures for the compensating winding are located in areas in the core, where the density of the magnetic flux is low but the flux distribution is still to some extent dependent on the mechanical force to be measured.

Figure 4:
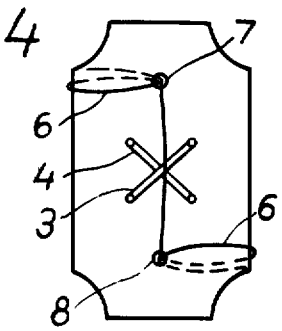
FIG. 4 shows another way of applying the compensating winding according to FIG. 1.

Similarly, the compensating winding can be arranged in many different ways, for example according to FIG. 4 showing two separate windings 6 which, in the case of series-connection, surround the same compensating flux as the winding shown in FIG. 1.

Figure 5:
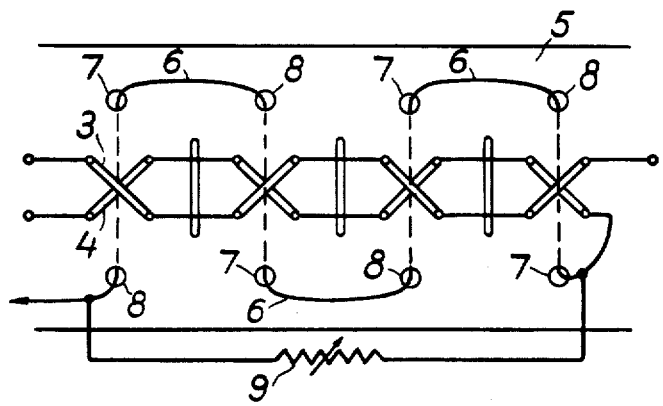
FIG. 5 shows a winding diagram for a transducer composed of a plurality of units connected to each other.
Figure 6:
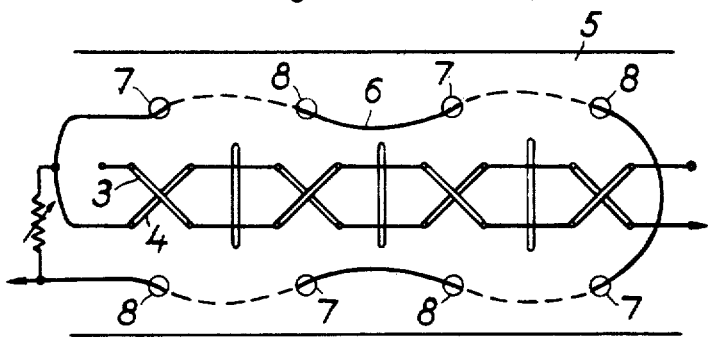
FIG. 6 shows a variant of the winding diagram according to FIG. 5.

FIGS. 5 and 6 show the invention applied to a transducer of the type disclosed in U.S. Pat. No. 3,093,999. FIG. 4 of said patent shows that above and below the measuring zone, that is, the area in the transducer where the magnetizing and measuring windings are located, there is provided an aperture which effects an unloading of the measuring zone. The compensating winding can also be applied in this aperture which already exists for another purpose. Also in this case a variety of winding arrangements are possible. FIGS. 5 and 6 show a few examples which are equivalent with regard to operation, both between themselves and in relation to the arrangement according to FIGS. 1 and 4.

Figure 7A:
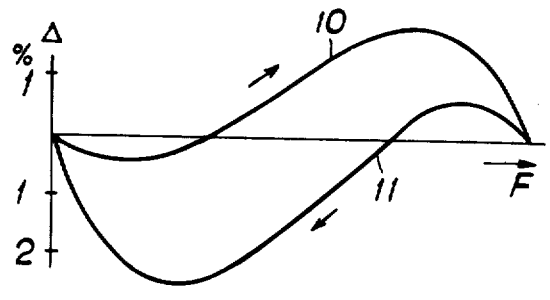
FIGS. 7a and 7b show the appearance of the hysteresis curve for an uncompensated transducer.
Figure 7B:
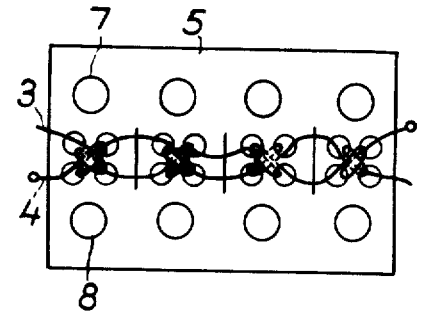

FIG. 7a shows the characteristic measured for a transducer designed in accordance with FIG. 7b, of the type shown in U.S. Pat. No. 3,093,999. The characteristic is shown here in the form of a so-called deviation curve, that is, the diagram shows the percental deviation of the characteristic from a straight line representing the average sensitivity within the measuring range, the very small deviations from the ideal rectilinear and hysteresis-free characteristic being emphasized. As can be seen the transducer measured has a hysteresis of about −0.2%.

Figure 8A:
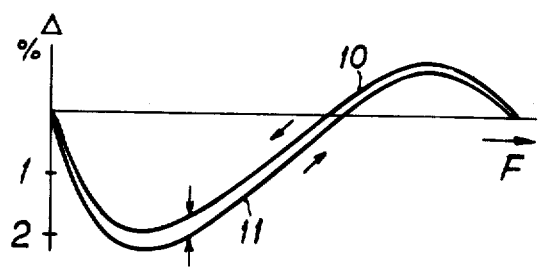
FIGS. 8a and 8b shows the appearance of the hysteresis curve for a compensated transducer but with an untrimmed compensating winding.
Figure 8B:
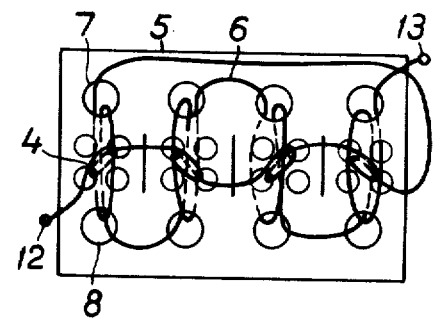

FIG. 8a shows the characteristic of the same transducer provided with a compensating winding according to FIG. 8b. The hysteresis is now overcompensated and has become about +0.05%.

Figure 9A:
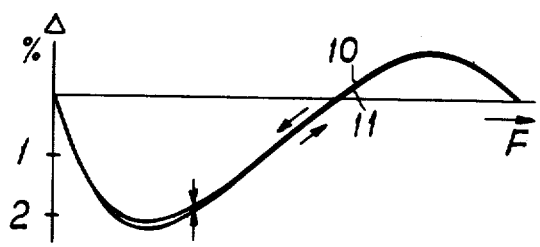
FIGS. 9a and 9b show the appearance of the hysteresis curve for a compensated and trimmed transducer.

FIG. 9a shows how the two branches of the characteristic has been caused practically to coincide with the help of the trimming resistor 9. This resistor shunts away part of the signal from the compensating winding 6, so that the remaining part has the same value as the hysteresis component of the signal from the measuring winding.

Figure 9B:
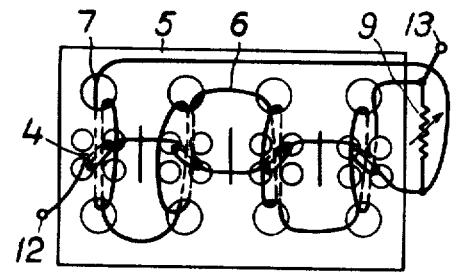

In FIGS. 8b and 9b only the measuring and compensating windings are shown and the terminal points of the series connection of the two windings are designated 12 and 13, respectively.

Figure 10:
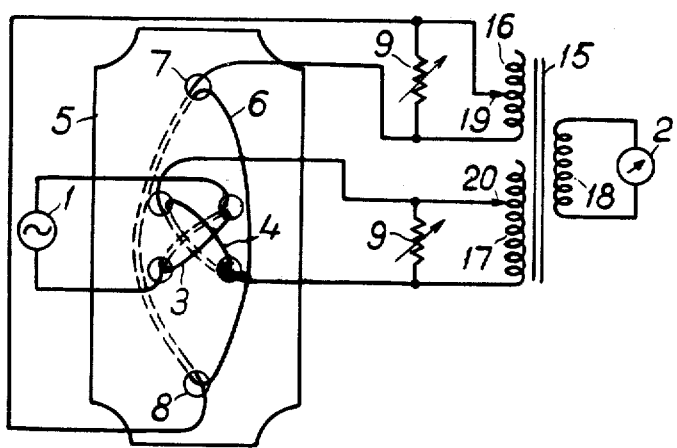
FIG. 10 shows a device for adding the hysteresis components by means of a matching transformer.

FIG. 10 shows an example of how the compensating signal and the measuring signal are summed by means of a matching transformer with an iron core 15, primary windings 16 and 17 and a secondary winding 18. The compensating winding 6 is connected to an adjustable number of turns on the primary winding 16 and, similarly, the measuring winding 4 is connected to the primary winding 17. The measuring device 2 is connected to the secondary winding 18. By means of the contacts 19 and 20 a coarse adjustment of the summation is made. Fine adjustment is performed thereafter by means of the trimming resistors 9.

Figure 11:
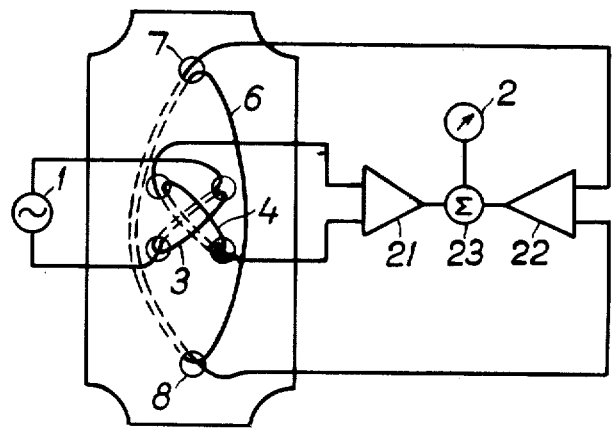
FIG. 11 shows summing by means of an amplifier.

FIG. 11 shows that the summing can be accomplished with the help of a pair of amplifiers 21 and 22, to the inputs of which there are connected windings 4 and 6, respectively. The output signals of the amplifiers are transferred to a summation device 23, to which the measuring device 2 is connected. Trimming of the arrangement is performed by controlling the impedances and the degree of amplification.

Figure 12:
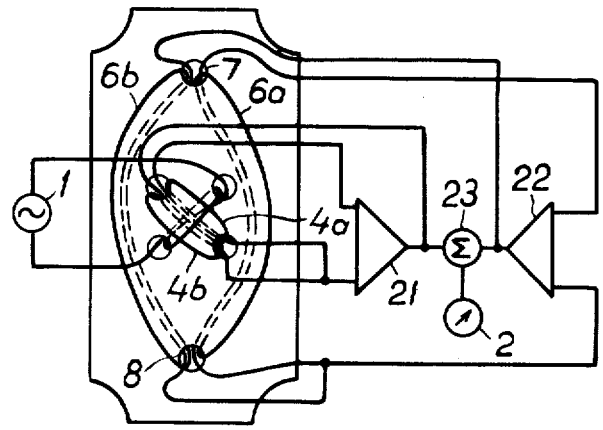
FIG. 12 shows summing by means of an amplifier with simultaneous magnetic feedback.

An alternative to the summation device according to FIG. 11 is shown in FIG. 12. The measuring winding as well as the compensating winding here consists of two parallel coils 4a, 4b and 6a, 6b, respectively. The signal induced in coil 4a is amplified in the amplifier 21 and returned to the input of the amplifier by way of coil 4b. The same procedure is applied to the compensating signal induced in coil 6a. This feedback of the signals causes the inner magnetic field of the transducer to be changed to a minimum extent.

Figure 13:
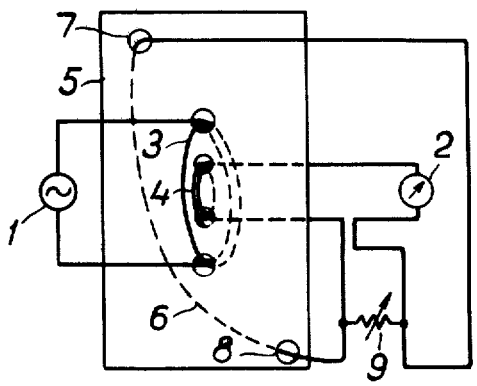
FIG. 13 shows the application of the invention to a transducer having the holes for the measuring windings in a straight line.

FIG. 13 shows the invention applied to a transducer according to Swedish Pat. No. 202,561. In this transducer the two windings 3 and 4 are placed in holes, all lying on a straight line with respect to each other. The holes 7 and 8 for the compensating winding can be placed in many different places, the essential thing being that the prerequisites stated above are fulfilled.

Figure 14A:
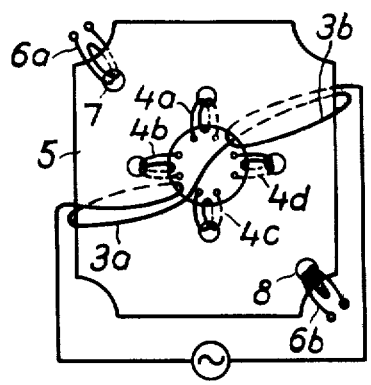
FIG. 14a shows the application of the invention to a transducer having a measuring winding constituted by four series-connected coils.
Figure 14B:
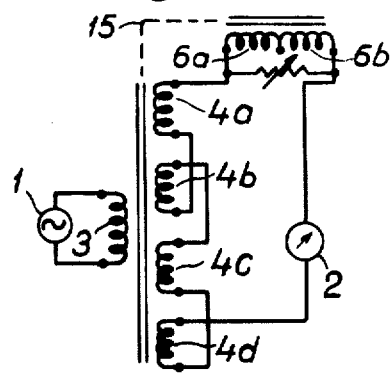
FIG. 14b shows a method of connecting the coils and the compensating coils to a measuring instrument.

FIG. 14a shows a transducer according to FIG. 2 of the Swedish printed patent application No. 351,292, with a magnetizing winding consisting of two coils 3a and 3b and a measuring winding consisting of four series-connected coils 4a, 4b, 4c and 4d. The invention can be applied to this transducer also by connecting said coils and the compensating winding 6a and 6b according to FIG. 14b.

Figure 15:
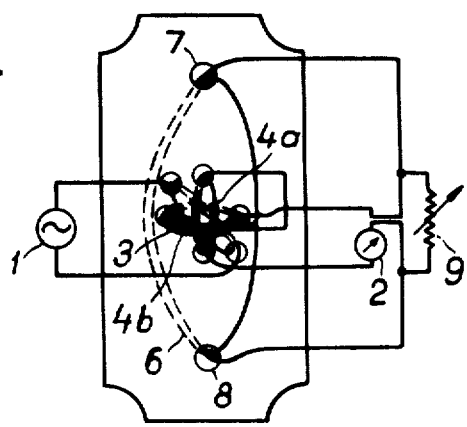
FIG. 15 shows the application of the invention to a transducer in which the measuring winding is divided into two coils perpendicular to each other.

The German printed patent application No. 1,220,635 discloses a transducer in which the windings are arranged according to FIG. 15. The magnetizing winding 3 is arranged in exactly the same way as shown in U.S. Pat. No. 2,895,332, whereas the measuring winding is divided into two coils 4a and 4b which are positioned perpendicular to each other and connected so that they together are equivalent to a winding which is perpendicular to the winding 3. Also here a compensating winding 6 can be inserted into holes 7 and 8 which can be placed as shown in FIG. 15. Summing of signals and trimming of circuits are carried out as described in connection with FIG. 1.

FIG. 16a shows a side view and FIG. 16b a view along the line B — B of FIG. 16a of a transducer which consists of two pressure plates 25 coupled to each other by means of two legs 26. A winding consisting of two coils 27 is arranged around the legs. Near the periphery of one of the plates 25, where the field from the windings 27 through which current flows is weak, there are holes 7,8 and a compensating winding 6 arranged in the holes. In this case the transducer operates as an inductive reactance, the inductivity of which is due to the mechanical force acting on the pressure plates. The inductivity change of the transducer is converted into a measuring signal, for example by means of a bridge connection according to FIG. 16c. The bridge consists of the transducer winding 27a, a balancing inductance 27b and a differential winding 17 on a matching transformer. To the output winding 18 of the transformer there is connected an indicating device 2 of a conventional kind and comprising devices for rectification, temperature compensation and the like. The impedance of the balancing impedance 27b and the transformation in the differential winding are chosen so that the bridge is essentially balanced when the transducer is unaffected by force, $F = O$. The inductance change of the transducer under the influence of the force $F$ causes an unbalance and, thus, an output voltage dependent on the force. The signal from the compensating winding 6 is added to the output voltage by means of an extra winding 16 on the matching transformer, similar to what has been shown previously in FIG. 10.

In order that the balance of the bridge should not be too much affected by changes in the voltage, the temperature and other disequilibrating effects, the balancing inductance may be designed so that its impedance is influenced by these disturbing effects in the same way as the impedance of the transducer. The easiest way to achieve this is by using, as a balancing inductance, a second transducer of the same design as the active transducer and by placing it close to said transducer, so that it is subjected to the same ambient temperature, but without being influenced by the force F to be measured. The second transducer, the dummy transducer, does not have to be provided with a compensating winding but may be. In that case the compensating winding of the dummy is series-connected in opposition to the compensating winding 6 of the active transducer, in this way achieving the complete symmetry in the bridge connection as far as the zero balance is concerned.

The connection described is of course only one example of a practicable bridge connection. The same main function can be attained by means of a great many other bridge connections, which is obvious to all those who are acquainted with electrical network theory. By providing the active transducer as well as the dummy transducer with an additional winding each, connected to the first one shown in FIG. 16a by a rigid magnetic coupling, there are provided possibilities of further coupling variants having essentially the same mode of operation, which will need no further explanation.

In a further developed embodiment it is possible to allow the two transducers included in the bridge connection to be active, that is, to be subjected to forces F1 and F2, respectively, in which case the output signal of the device is essentially dependent on the difference between the two forces, namely F1 — F2. An arrangement of this kind may be useful, for example, when measuring the torque (couple of forces). Also in this case it is possible to perform hysteresis compensation according to the invention.

FIGS. 17a and 17c show transducers according to the British Pat. No. 1,201,111. Both transducers are provided with magnetizing windings 3a and 3b and measuring windings 4a and 4b. The windings are arranged so that substantially only one of the pairs is affected by an externally applied force F, the other pair working as a reference. According to the invention compensating windings 6 are located in holes 7 and 8. In principle these windings can be placed anywhere except perpendicular to and symmetrically in relation to the windings 3 and 4. The measuring signals are summed, for example, in a matching transformer or directly as indicated in FIG. 17b and 17d. These figures show the connection of the magnetizing windings 3a and 3b and measuring windings 4a, 4b and compensating windings 6a, 6b in FIG. 17b, respectively, or 6 in FIG. 17d. An iron core common for the arrangement is designated 15. Alternative positions of the holes 7 and 8 are marked by broken rings, where one of the holes may be common for both windings.

In the transducer according to FIG. 17c the winding pairs are placed in parallel, but one pair is placed so that the influence exerted on it by the force F is negligible. The compensating winding 6 is placed symmetrically to the winding pair 3b, 4b and the summing is performed as shown in FIG. 17d.

Figure 18A:
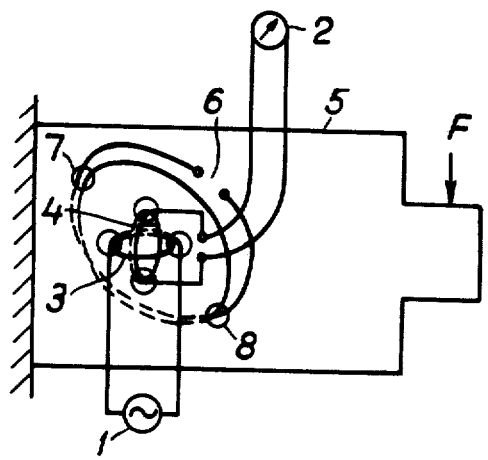
FIG. 18a shows the application of the invention to a transducer positioned in a beam which is subject to a bending force.
Figure 18B:
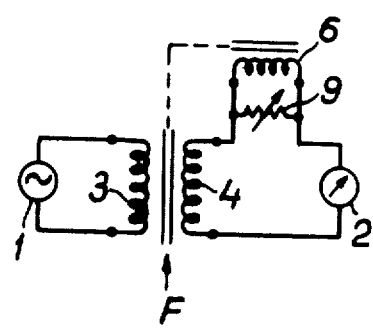

As is clear from FIGS. 18a and 18b, the invention can be applied also to a transducer according to U.S. Pat. No. 3,613,442. The summing of the signals is carried out as shown in FIG. 18b and previously described.

Also here the holes 7 and 8 can be placed anywhere except in the neutral plane of the beam 5.

Figure 19:
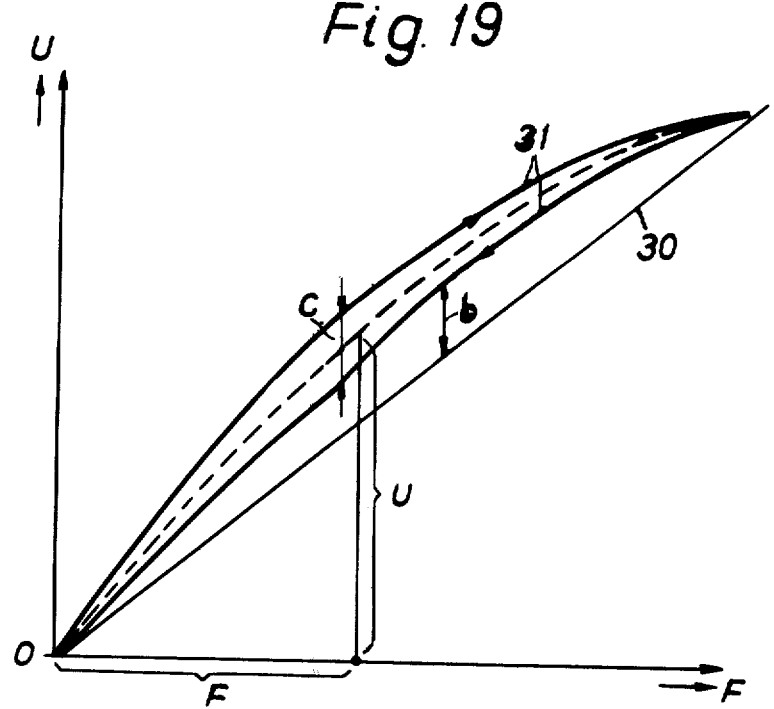
FIG. 19 shows the connection between the output signal and the measuring quantity of a transducer.

FIG. 19 illustrates the proportion between the output signal U of a transducer and the force F which brings about this output signal. This proportion, the characteristic of the transducer, is in the ideal case the straight line 30 passing through the origin of coordinates O. The inclination of the line is described as the sensitivity of the transducer. In practice deviations from the ideal characteristic 30 are obtained, both in the form of nonlinearity $b$ and in the form of hysteresis $c$. The characteristic obtained in practice has the form of two bent curve parts 31. By nonlinearity is meant the deviation of the curve parts 31 from the line 30 at a certain value of the force F and by hysteresis $c$ is meant the distance between the curve parts 31 at the same point. The invention aims at making the two curve parts 31 coincide, so that the transducer always gives the same output signal U at a certain value of F, regardless of whether F is increasing or decreasing.

I claim:

1. In a magnetoelastic transducer which consists essentially of an iron core with first apertures therein and winding means arranged in said first apertures for generating a magnetic field in the core and sensing the changes in the magnetic field which occur when the core is affected by a mechanical force, the core (5) being provided with second apertures (6,7) therein, located where the field strength is considerably lower than around the apertures for the measuring winding means (4) and where the mechanical stress condition is dependent on the mechanical force, acting on the core, which is to be measured, at least one compensating winding in said second apertures, and means connected to said winding means and said compensating winding for adding the signal generated in the compensating winding (6) and the signal generated in the winding means (4, 4a, 4b) which sense the alterations of the magnetic field; and said adding means including means operating in such a phase position of the signals that the hysteresis component of the compensating signal is in opposition to the hysteresis component of the winding means signal.

2. Means according to claim 1, the compensating winding (6) and the winding means (4, 4a, 4b) sensing the alterations of the magnetic flux being connected in series.

3. Means according to claim 1, having a trimming resistor in parallel with the compensating winding.

4. Means according to claim 1, in which the adding means includes a matching transformer.

* * * * *